:

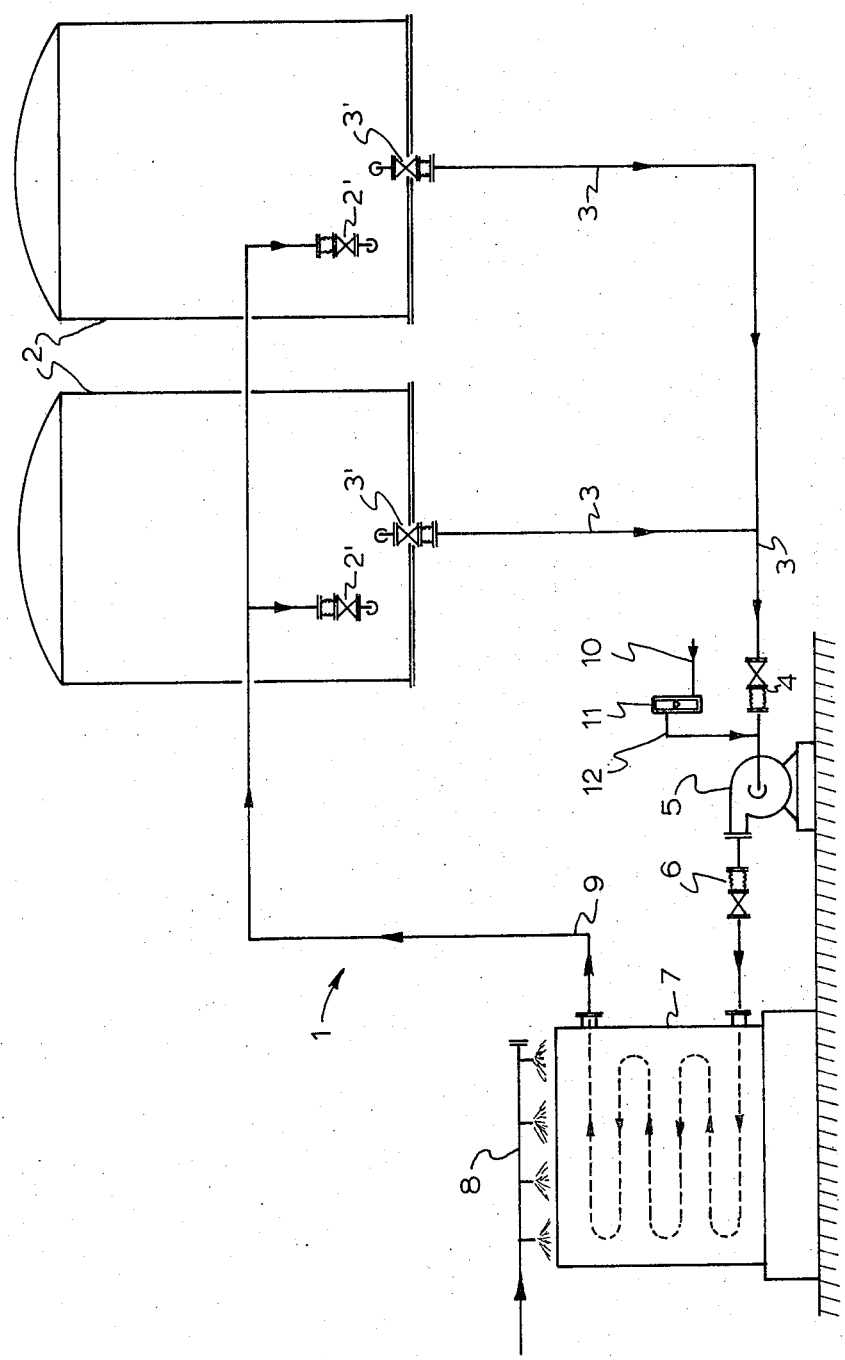

United States Patent Office 3,698,858
Patented Oct. 17, 1972

---

3,698,858
PROCESS OF INHIBITING CORROSION IN SPENT SULFURIC ACID SLUDGE SYSTEMS
Carl E. Stromberg, Richmond, and John Reynolds, El Cerrito, Calif., assignors to Stauffer Chemical Company, New York, N.Y.
Continuation-in-part of abandoned application Ser. No. 27,555, Apr. 13, 1970. This application Oct. 6, 1971, Ser. No. 187,119
Int. Cl. C01b *17/92;* C23f *11/04*
U.S. Cl. 21—2.5     3 Claims

ABSTRACT OF THE DISCLOSURE

A system for reducing the corrosion rate on metals in a spent sulfuric acid sludge recovery process. This system comprises the addition of a corrosion inhibitor to spent sulfuric acid sludges, as it is pumped from a storage medium through a heat exchanger to maintain these sludges at a constant temperature. The corrosion inhibitors consist of water or water in the form of dilute fresh sulfuric acid.

BACKGROUND OF THE INVENTION

Sulfuric acid has long been used as a catalyst in many industrial processes. One such process is the alkylation of hydrocarbons. After the sulfuric acid catalyst has been used in these processes, it will contain alkylation products as well as alkylation contaminants. The spent acid is then processed to remove the alkylation products and contaminants. This treated spent acid will contain trace amounts of alkylation products and contaminants and over 80% by weight sulfuric acid. The acid is conveyed to a primary recovery system where it is converted to fresh acid. This primary recovery system entails the heating or burning of the acid to convert it to $SO_2$ which can readily be converted to fresh sulfuric acid. The residue or alkylation products and contaminants are further processed to remove the alkylation products as by stripping or other separation techniques. The residue from this process will contain less than 50% by weight sulfuric acid with the remainder being an unidentifiable mixture of contaminants that are acid in nature and very odiferous. This latter residue has been termed spent sulfuric acid sludge. Such a process is described in U.S. Pat. No. 3,462,512. Since these sludges can not be dumped, they are conveyed to a secondary recovery system, where it is converted to fresh sulfuric acid for reuse. This secondary recovery process also entails the heating or burning of the spent sulfuric acid sludge to convert it into sulfur dioxide. The sulfur dioxide can then be readily converted, using a catalyst, to fresh sulfuric acid.

Since it may be inconvenient to pump or convey the spent sulfuric acid sludge directly into the secondary recovery process system, it becomes necessary to store the spent sulfuric acid sludges prior to conversion. The spent sulfuric acid sludge is conveyed to tanks where it is stored until it can be conveyed to the secondary recovery system.

In the storage system, it is necessary to maintain the spent sulfuric acid sludges at a constant temperature. It is necessary to circulate the stored spent sulfuric acid sludge through heat exchange mediums to maintain the same at a constant temperature. Since some of the spent sulfuric acid sludges are highly corrosive, high maintenance is required on the metal parts and other apparatus. In order to reduce the amount of corrosion on the metal parts, corrosion inhibitors have been suggested for use. One such corrosion inhibitor is arsenic compounds. However, these arsenic compounds are very expensive to use and must be separated from gas streams in the process of converting the spent sulfuric acid sludge into fresh sulfuric acid as noted above. This separation process entails additional equipment and is rather expensive. Moreover, the use of arsenic compounds presents complicated pollution problems since the compounds are highly toxic.

CROSS REFERENCE TO RELATED APPLICATION

This application is a continuation-in-part of copending application Ser. No. 27,555 filed Apr. 13, 1970, entitled Process of Inhibiting Corrosion in Spent Sulfuric Acid Systems and now abandoned.

BRIEF DESCRIPTION OF THE INVENTION

It has been discovered that the corrosion rate on metal parts in the circulation system of the spent sulfuric acid sludge can be materially reduced by adding thereto a corrosion inhibitor in the form of water or water in the form of dilute sulfuric acid. Quite surprisingly, the corrosion rate on steel is reduced several hundred times by using this process.

BRIEF DESCRIPTION OF THE DRAWINGS

The single figure is a schematic illustration of the present invention.

DETAILED DESCRIPTION OF THE INVENTION

In the practice of the present invention, spent sulfuric acid sludges are circulated in the system indicated at 1, which includes a plurality of storage tanks 2. While only two tanks are illustrated, it is to be understood that a plurality of tanks can be used in tandem, if so desired. Thus, the spent sulfuric acid sludge stored in the tanks 2 is pumped through line 3 by means 5 into the heat exchange means 7 and back into the tanks 2 by line 9. Proper control of the spent sulfuric acid sludge is provided by flow control means 2', 3', 4 and 6. As the spent sulfuric acid sludge is pumped through heat exchange means 7, heat transfer fluid is sprayed onto the conduits therein from a suitable source 8. It is to be understood that the fluid that is sprayed thereon can add heat or remove heat, as is desirable to maintain a nearly constant temperature of the spent sulfuric acid sludges.

Connected into conduit 3 between pump 5 and flow control means 4 is line 12, which is connected to a flow meter 11. Water is pumped through flow meter 11 from any source 10. Thus, the amount of water that is added to the system can be carefully controlled.

It has been found in practice that the addition of water to such a system drastically reduces the amount of the corrosion rate on metal parts.

In order to illustrate the merits of the present invention, the following examples are provided:

Examples

Spent sulfuric acid sludges was obtained from a source and stored in containers. From this supply various mixtures of water and sludge were prepared in sufficient volume to test the corrosion rate of each on mild steel coupons in accordance with a method similar to ASTM/D185–43T. Runs were made at ambient temperatures 70° to 80° F.

The results of the tests are shown in the table. The corrosion rates are expressed in mils per year and the amount of water added are given in percent by volume in the total mixtures.

TABLE

| Run No.: | Amount of water added, percent by volume | Corrosion rate, mils/year |
| --- | --- | --- |
| 1 | [1] 0 | 147.0 |
| 2 | 1 | 157.0 |
| 3 | 2 | 120.0 |
| 4 | 5 | 26.0 |
| 5 | 10 | 0.4 |
| 6 | 20 | 0.4 |
| 7 | 50 | 84.0 |

[1] Control.

As can be seen by the above table, there is a sharp decrease in corrosion rate when more than 2% by volume of water is added to the system. Moreover, when above 5% water is added, a further decrease in corrosion rate is noted. However, as the amount of water approaches 50% by volume, the corrosion rate then increases above desirable levels. Thus, the amount of water added to the system can range above about 2% by volume and below about 50% by volume.

We claim:

1. A process of reducing the corrosion rate of metal parts in a circulating system for spent sulfuric acid sludge wherein said sludge is the residue from a primary acid recovery system from a hydrocarbon alkylation process in which sulfuric acid has been utilized as a catalyst and contains less than 50% by weight sulfuric acid comprising adding to said spent sulfuric acid sludge an effective amount of a corrosion inhibitor, said corrosion inhibitor comprising water.

2. The process as set forth in claim 1 wherein the amount of water added ranges from above about 2% by volume to less than about 50% by volume.

3. The process as set forth in claim 1 wherein said spent sulfuric acid sludge is circulated from a storage medium through a heat exchange medium and said water is added prior to the heat exchange medium.

References Cited

UNITED STATES PATENTS

| | | | |
| --- | --- | --- | --- |
| 2,111,920 | 3/1938 | Wells | 23—173 X |
| 2,441,521 | 5/1948 | Van Der Valk et al. | 23—173 |
| 2,478,680 | 8/1949 | Beamer et al. | 23—173 |
| 3,462,512 | 8/1969 | Goldsby | 260—683.62 |

OTHER REFERENCES

H. H. Uhlg, The Corrosion Handbook; John Wiley & Sons, Inc; New York; 1948; pp. 132–133 relied on.

BARRY S. RICHMAN, Primary Examiner

U.S. Cl. X.R.

21—2.7; 23—173